United States Patent [19]

Shimizu et al.

[11] Patent Number: 5,118,038
[45] Date of Patent: Jun. 2, 1992

[54] BLOWOUT TEMPERATURE CONTROL APPARATUS OF AIR CONDITIONER FOR AUTOMOBILES

[75] Inventors: Shiyuuichi Shimizu; Tsuneo Kagohata, both of Ibaraki; Hyousei Horiguchi, Katsuta, all of Japan

[73] Assignees: Hitachi Ltd., Chiyoda; Hitachi Automotive Engineering Co., Ltd., Ibaraki, both of Japan

[21] Appl. No.: 445,050

[22] Filed: Dec. 4, 1989

[30] Foreign Application Priority Data

Dec. 7, 1988 [JP] Japan .................................. 63-307837

[51] Int. Cl.⁵ ........................................... G05D 23/00
[52] U.S. Cl. .............................. 237/2 A; 237/12.3 A; 237/12.3 B
[58] Field of Search ............. 237/2 A, 12.3 A, 12.3 B; 165/41, 42

[56] References Cited

U.S. PATENT DOCUMENTS

| | | | |
|---|---|---|---|
| 3,658,244 | 4/1972 | Caldwell | 237/2 A |
| 4,757,944 | 7/1988 | Kagohata et al. | 236/91 F |
| 4,829,884 | 5/1989 | Kagohata | 98/2.01 |

FOREIGN PATENT DOCUMENTS 145515 8/1983 Japan .................................. 237/2 A Primary Examiner—Henry A. Bennet
Attorney, Agent, or Firm—Antonelli, Terry Stout & Kraus

[57] ABSTRACT

A blowout temperature control apparatus of an air conditioner for automobiles comprises blowout temperature control means including blowout mode detecting means for detecting one of the outlet ports associated with blowout air temperature detecting means through which delivery of air is being stopped and generating a blowout stop signal, and blowout stop timed control means, responsive to the generation of the blowout stop signal, for controlling an air mixing door associated with the outlet port to temporarily change the amount of heat exchange of the heat exchanger to a reference level (Full Cool) and again change the heat exchange amount to a predetermined constant level complying with individual blowout modes and for maintaining the heat exchange amount at the constant level while the blowout stop signal is valid.

9 Claims, 6 Drawing Sheets

BLOWOUT TEMPERATURE CONTROL APPARATUS OF AIR CONDITIONER FOR AUTOMOBILES

BACKGROUND OF THE INVENTION

This invention relates to an air conditioner for automobiles and more particularly to a blowout temperature control apparatus for stable control of blowout temperatures.

A blowout temperature control apparatus of an air conditioner for automobiles serves to control blowout temperatures of air blowing in the passenger room. In the past, as disclosed in U.S. Pat. No. 4,757,944 to Kagohata et al, this type of blowout temperature control apparatus has been proposed wherein a plurality of outlet ports are provided at which temperatures can be controlled independently, and temperature sensors sensors for detection of the blowout temperatures (called duct sensors) are disposed at the respective outlet ports, whereby the opening of each air mixing door is controlled such that the difference between a signal from an associated duct sensor and a blowout temperature calculated in advance approaches zero, thereby ensuring that the blowout temperature can be controlled independently at each outlet port in compliance with individual blowout modes without using any feedback potentiometer.

Further, JP-A-58-145515 by Hitachi, Ltd., filed in Japan on Feb. 24, 1982, has proposed a temperature control apparatus wherein when the thermal load is large and sufficient cooling capability is required therefor, a water cock for regulation of the flow rate of hot water flowing into a heater core is closed to stop the flow of hot water into the heater core, causing the heater core not to depress cooling capability and consequently maintaining the sufficient cooling capability.

The first prior art however fails to consider that the position of the air mixing door 11 during the blowout mode being the ventilation mode is always uncertain. More particularly, since in the aforementioned blowout mode the floor duct sensor 103L does not receive blowout air, this sensor 103L detects ambient temperatures not related directly to the blowout temperature and the opening of the air mixing door 11 is controlled on the basis of a detected temperature to cause the air mixing door 11 to behave unstably. Under this condition, when the blowout mode changes from the aforementioned ventilation mode to another mode such as bi-level mode or floor/ventilation mode to be described later, uncomfortable blowout temperatures disadvantageously take place temporarily before the floor duct sensor 103L detects a proper blowout temperature to control the opening of the air mixing door 11 to a suitable value.

Further, when the second prior art, JP-A-58-145515 is applied to the blowout mode being the ventilation mode or the floor/ventilation mode for which maintenance of cooling capability is required, air conditioning is carried out under the condition that the water cock 16 for regulation of the amount of hot water flowing in the heater core 3 is closed and therefore, after coincidence of the blowout temperature with a target value, air conditioning is effected with the heater core 3 sufficiently cooled. Under this condition, even if the blowout air temperature is desired to be raised and the air mixing door is moved toward "Hot", the blowout air temperature will not rise because the heater core 3 is cooled sufficiently as described above, and the air mixing door continues moving toward "Hot". At that time, when the blowout mode changes to, for example, the bi-level to comply with changes in outside air temperature Ta and insolation amount Zm, the water cock 16 is abruptly opened for heating and a large amount of hot water follows into the heater core 3 to abruptly heat it up. Then, with the air mixing door moved toward "Hot" as described hereinbefore, uncomfortable blowout temperatures disadvantageously take place temporarily before control of the air mixing door to a suitable opening it completed.

One may also refer to U.S. Pat. No. 4,829,884 to Kagohata which discloses control of blowout temperature effected on the basis of signals from individual blowout air temperature detecting means.

Continuous switching of the blowout mode and blowout temperature control without resort to any potentiometer for detection of air mixing door position which are relevant to the present invention are also described in U.S. patent application Ser. No. 93228 filed September, 1987.

SUMMARY OF THE INVENTION

An object of the invention is to provide an air conditioner for automobiles which can exactly stop the opening of the air mixing door at a constant value without resort to any potentiometer for detection of air mixing door opening when the ventilation mode or the floor/ventilation mode is selected as the blowout mode and therefore, upon change of the blowout mode to modes other than the above, can prevent the generation of uncomfortable blowout temperatures due to uncertain opening positions of the air mixing door.

Another object of the invention is to provide an air conditioner for automobiles which, when the ventilation mode or the floor/ventilation mode is selected as the blowout mode, can fix the opening of the air mixing door, without resort to any potentiometer for detection of air mixing door opening, at a position at which cooling capability required for each mode can be obtained and therefore can prevent the generation of uncomfortable blowout temperatures due to open/close of the water cock.

According to the invention, the above main object can be accomplished by temporarily moving the air mixing door to "Full Cool" (corresponding to full closure of the air mixing door) when the blowout mode changes to the ventilation mode or the floor/ventilation mode and subsequently by operating the air mixing door in the direction of opening for an interval of time X in the ventilation mode or for an interval of time Y (X<Y) in the floor/ventilation mode in order to obtain a requisite constant opening in compliance with the magnitude of the thermal load.

The second object can be accomplished by delivering a signal for temporarily moving the air mixing door to "Full Cool" (corresponding to full closure of the air mixing door) when the blowout mode changes to the ventilation mode or the floor/ventilation mode and thereafter by again operating the air mixing door in the direction of opening for an interval of time necessary to obtain a requisite constant opening. In addition, the air mixing door is operated in a similar manner when the setting temperature is raised, thus enabling the air mixing door to recover a suitable opening even in the event that the opening of the air mixing door accidentally changes to an unsuitable value.

Accordingly, blowout mode detection means generates a blowout stop signal, and temporarily changes the amount of heat exchange of a heat exchanger to a reference level when the blowout stop signal is generated. After that, the amount of heat exchange of the heat exchanger is changed to be a predetermined constant level so as to maintain the level while the blowout stop signal is generating. When there is the blowout stop signal the amount of heat exchange of the heat exchanger is temporarily changed to be the reference level when manipulation to raise the setting temperature is effected and again the amount of heat exchange of the heat exchanger is changed to be a constant level, thereby preventing uncomfortable blowout temperatures from taking place.

DESCRIPTION OF THE PREFERRED EMBODIMENTS

Figure 1:
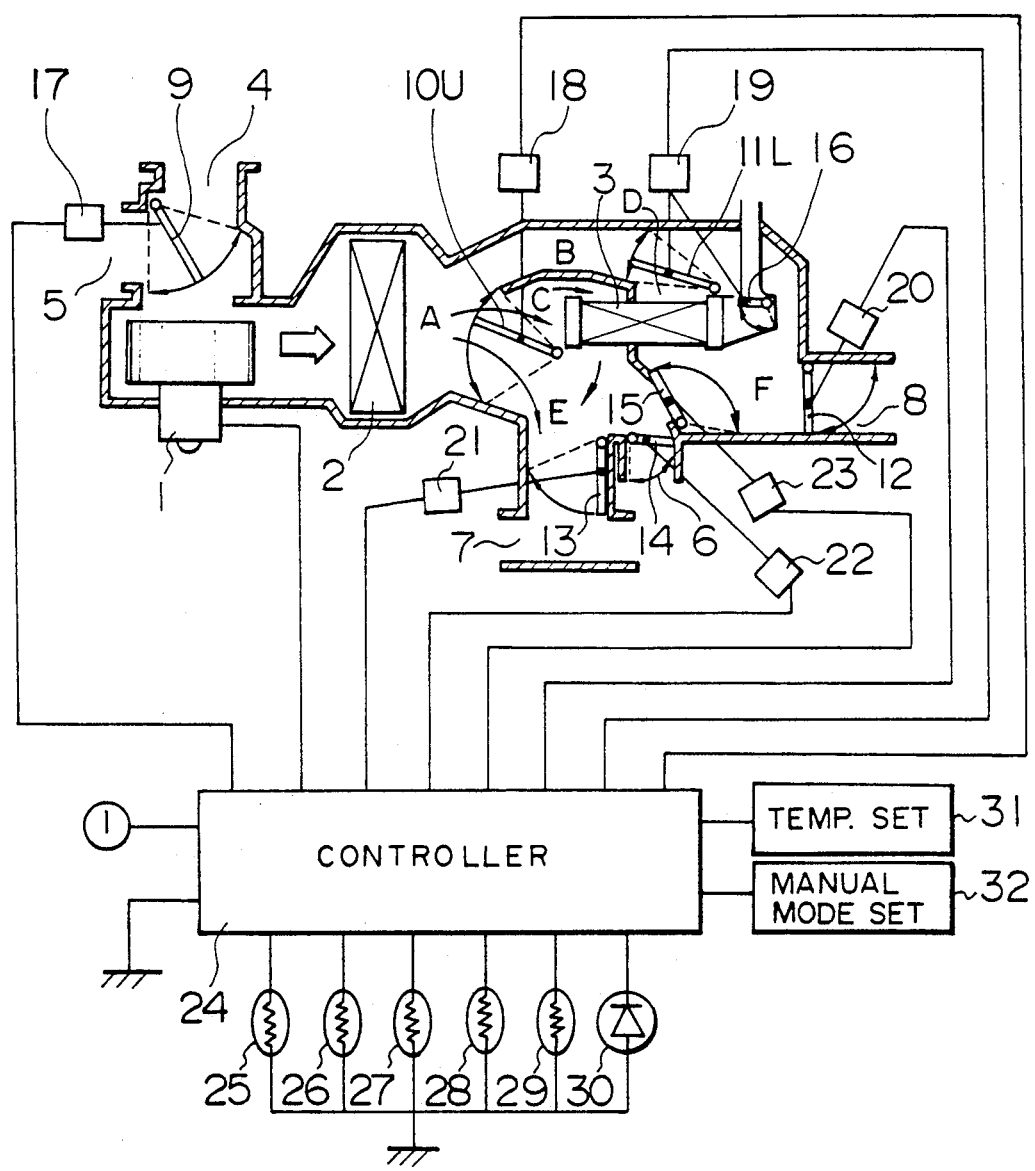
FIG. 1 is a schematic diagram illustrating an embodiment of an air conditioner for automobiles of the invention.

A preferred embodiment of the invention will now be described with reference to FIGS. 1 to 7. Referring in particular to FIG. 1, a blowout temperature control apparatus of an air conditioner for automobiles comprises a motor 1 of a blower, an evaporator 2 standing for a heat exchanger for cooling, a heater core 3 standing for a heat exchanger for heating, an outside air inlet port 4 for intake of fresh air from the outside of a car, an inside air inlet port 5 for intake of air prevailing in the car, a defroster outlet port 6, a ventilation outlet port 7, a floor outlet port 8, an intake door 9 operable to transfer between the outside air inlet port 4 and the inside air inlet port 5, an air mixing door 10U adapted to permit mixing of air for ventilation (U signifies "upper area"), an air mixing door 11L adapted to permits mixing of air directed towards the floor (L signifies "lower area"), a floor door 12 to open or close the floor outlet port 8, a ventilation door 13 to open or close the ventilation outlet port 7, a defroster door 14 to open or close the defroster outlet port 6, a by-pass door 15 operable to change the amount of air from the heater core which is to be by-passed, a water cock 16 interlocked with the air mixing door 11L and operable to regulate the amount of hot water flowing through the heater core 3, electric actuators 17 to 23 adapted to continuously change the opening of the individual doors as well as the water cock 16, a defroster duct sensor 25 for detection of temperatures of air blowing out of the defroster outlet port 6, a ventilation duct sensor 26 for detection of temperatures of air blowing out of the ventilation outlet port, a floor duct sensor 27 for detection of temperatures of air blowing out of the floor outlet port, an outside air temperature sensor 28 for detection of temperatures of outside air, a room temperature sensor 29 for detection of temperatures inside the car, an insolation sensor 30 for detection of the amount of insolation, a temperature setter 31 operative to raise or lower the setting temperature, a manual mode setter 32 operative to set any of manual modes, and a controller 24 comprised of a microcomputer, multiplexers, A/D converters and other interfaces and operable to receive and calculate values of the duct sensors 25 to 27, outside air temperature sensor 28, room temperature sensor 29, insolation sensor 30 and temperature setter and thereafter drive the electric actuators 17 to 23.

Figure 2:
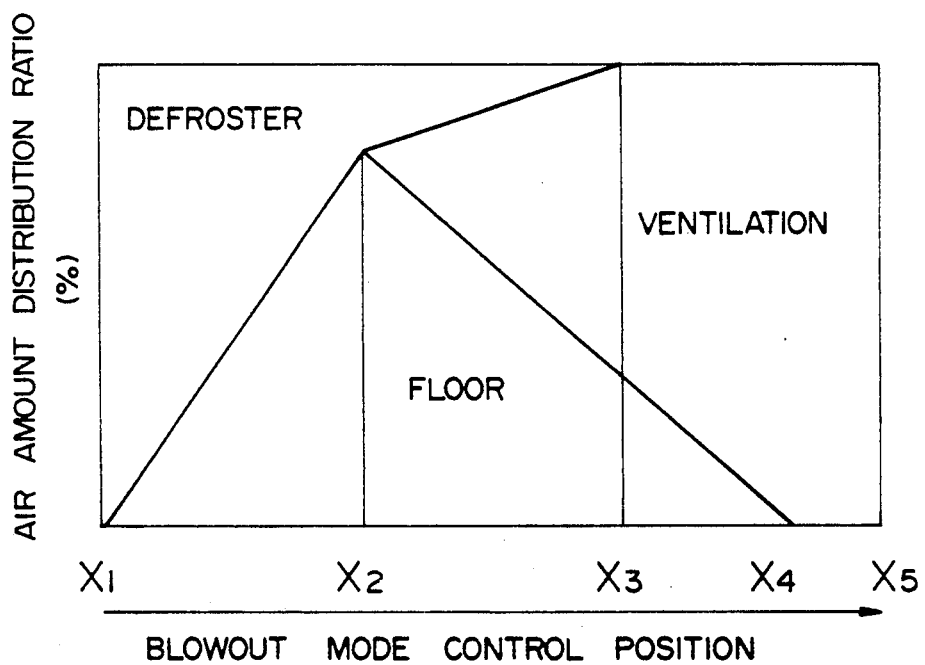
FIG. 2 is a graphic representation showing the relation between the blowout mode control position and the air amount distribution ratio.

Graphically shown in FIG. 2 are characteristics of continuous control of blowout mode in a heater unit of upper and lower independent reheater air mixing type. In order to carry out this type of continuous control, the electric floor door actuator 20 for driving the floor door 12 and the electric ventilation door actuator 21 for driving the ventilation door 13 are provided in the apparatus of FIG. 1 and the opening of each door is controlled continuously. As regards the blowout mode, FIG. 1 shows the operation of the air conditioner in the ventilation mode which corresponds to a point X5 on abscissa in FIG. 2. As the floor door 12 opens gradually, beginning with the operation state shown in FIG. 1, the blowout mode shifts to the bi-level mode. This corresponds to movement from the point X5 to a point X3 through a point X4 on abscissa in FIG. 2. On the other hand, as the ventilation door 13 closes gradually and at the same time the floor door 12 and defroster door 14 open gradually, beginning with the operation state shown in FIG. 1, the blowout mode coincides with the heater (demist) mode when the ventilation door 13 is fully closed. This corresponds to movement from the point X5 to a point X2 through the points X4 and X3 on abscissa in FIG. 2. Thereafter, the floor door 12 closes gradually, beginning with the point X2, the blowout mode coincides with the defroster mode when the floor door 12 is fully closed. This corresponds to movement from the point X2 to a point X1 on abscissa in FIG. 2. By controlling open/close of the individual doors associated with outlet ports in this manner on the basis of outside air temperature Ta and insolation amount Zm, continuous switching of the blowout mode can be achieved.

Incidentally, in order to independently detect temperatures of air blowing out of the respective outlet ports of the air conditioner unit (blowout temperatures), the defroster duct sensor 25, ventilation duct sensor 26 and floor duct sensor 27 are disposed at the respective outlet ports. Temperature signals produced from these sensors are transmitted to the controller 24 so that the opening of an air mixing door participating in the instant blowout mode of the air conditioner may be controlled in such a manner that a blowout temperature detected by a duct sensor effective for the instant blowout mode approaches a target blowout temperature calculated in advance, thereby realizing blowout temperature control without resort to any potentiometer.

The fundamental blowout mode state in the air conditioner shown in FIG. 1 will now be described with reference to FIGS. 1 to 4. Included in the fundamental blowout mode are the ventilation mode, the bi-level mode and the floor/ventilation mode as will be described below.

Figure 3:
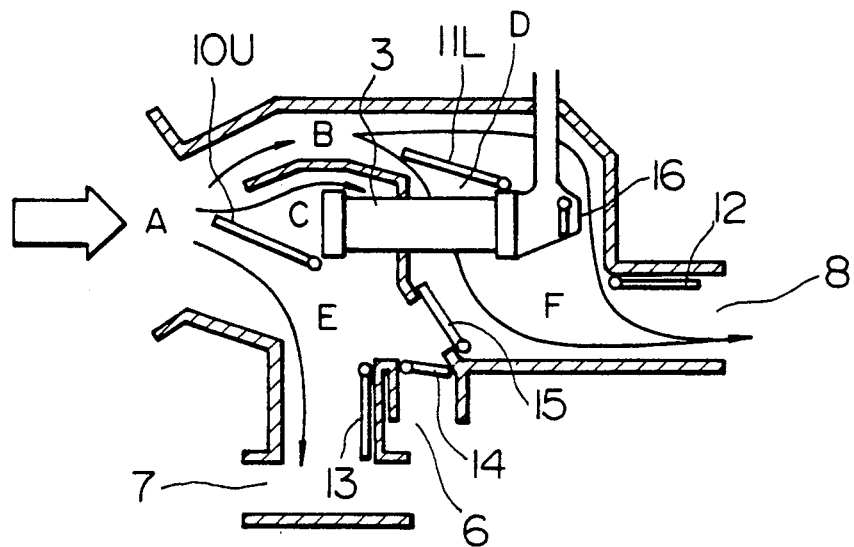
FIGS. 3 and 4 are fragmentary diagrammatic representations showing the heater unit operating in different blowout modes in the prior art.
Figure 4:
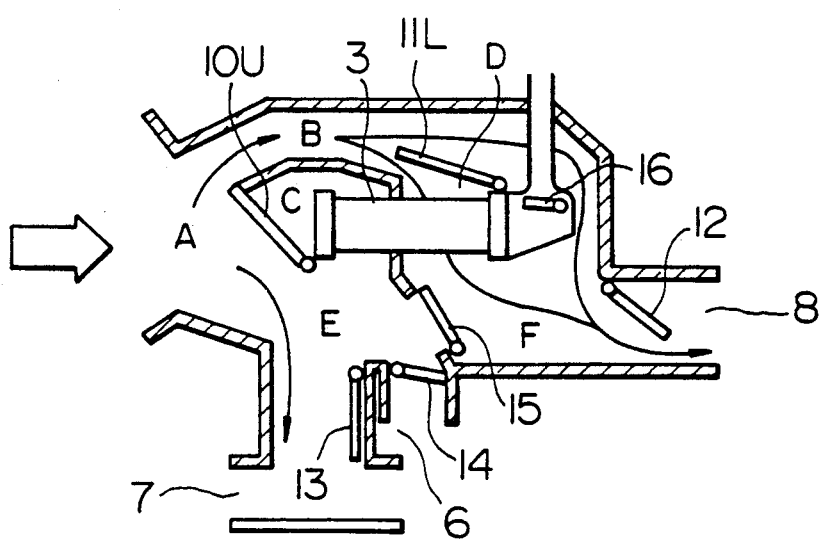

As regards the blowout mode, FIG. 1 shows the ventilation mode as described previously. The ventilation mode is selectively carried out mainly under the condition of high temperature of outside air. Because of the by-pass door is closed, the water cock 16 is closed fully with a view of maintaining cooling capability. Then, when air blowing out of the blower driven by the motor 1 flows through a path A→C→E as shown by arrows, air conditioned by the aid of the air mixing door 10U is forced to blow out of the ventilation outlet port 7 to provide ventilation air directed to the room. On the other hand, the blowout mode as shown in FIG. 3 is the bi-level mode. In the bi-level mode, air blowing out of the blower flows through the path A→C→E and a path A→B→D→F as shown by arrow and because of closure of the by-pass door 15, air conditioned with the aid of the air mixing door 10U and air conditioned with the aid of the air mixing door 11L blow independently in the room and in the floor to provide ventilation air and floor air, respectively. The blowout mode as shown in FIG. 4 is the floor and ventilation (floor/ventilation) mode. In the floor/ventilation mode, air blowing out of the blower flows through the paths A→C→E and A→B→D→F as shown by arrows and air conditioned with the aid of the air mixing door 11L blow air for ventilation and air directed toward the floor blow in the room independently. Accordingly, the bi-level mode and the floor/ventilation mode are in essentially the same blowout mode. Strictly, however, the bi-level mode is a blowout mode which is selected mainly under the condition of low outside air temperature for the purpose of warming the foot and in which the floor door 12 and the water cock 16 are both opened fully. On the contrary, the floor/ventilation mode is a blowout mode which is selected mainly under the condition of high outside air temperature (higher than the outside air temperature at which the ventilation mode is selected) for the sake of conveying cooling air to the foot to remove a hot feeling from the foot and in which the floor door 12 is half opened and the water cock 16 is closed fully.

Incidentally, it is essential that independent actuators are provided, respectively, in association with the air mixing door 11L and water cock 16. However, because of expensiveness due to the provision of the independent actuators, the air mixing door 11L is mechanically interlocked with the water cock 16 to achieve the requisite operation at inexpensiveness, in view of the fact that the control can be done well by closing the water cock 16 when the air mixing door is set to "Full Cool" and by opening the water cock in the other case.

Incidentally, in carrying out the continuous control having characteristics shown in FIG. 2 with the previously-described apparatus without resort to any potentiometer, when the ventilation mode shown in FIG. 1 or the floor/ventilation mode shown in FIG. 4 which is to be selected mainly under the condition of high outside air temperature is selected as the blowout mode, the heat exchanger is required to maintain cooling capability and therefore the air mixing doors 10U and 11L are both moved to "Full Cool". Consequently, the blowout temperature control is effected with the water cock 16 interlocked with the air mixing door 11L closed fully. As the time elapses and the blowout temperature at the outlet port reaches a target value, the air mixing door 10U is then operated so as to maintain the target temperature. However, since the water cock 16 remains closed fully to prevent hot water from flowing into the heater core 3, the blowout temperature is not raised where necessary even if the air mixing door 10U is moved towards "Hot" to increase the amount of hot air by the heat exchanger. Consequently, the air mixing door 10U is further moved towards "Hot", approaching "Full Hot" eventually. If at that time the blowout mode changes to, for example, the bi-level mode owing to a change in outside air temperature Ta and the like factor, hot air directed towards the foot is needed and hence the water cock 16 is opened. As a result, a large amount of hot water flows into the heater core 3, causing the temperature of the heater core 3 to rise abruptly and the air mixing door 10U to start air-conditioning, beginning with the instant position, and the blowout temperature changes transiently. The resulting blowout temperature can not be settled definitely and rises temporarily to give an uncomfortable feeling to the passengers.

Figure 5:
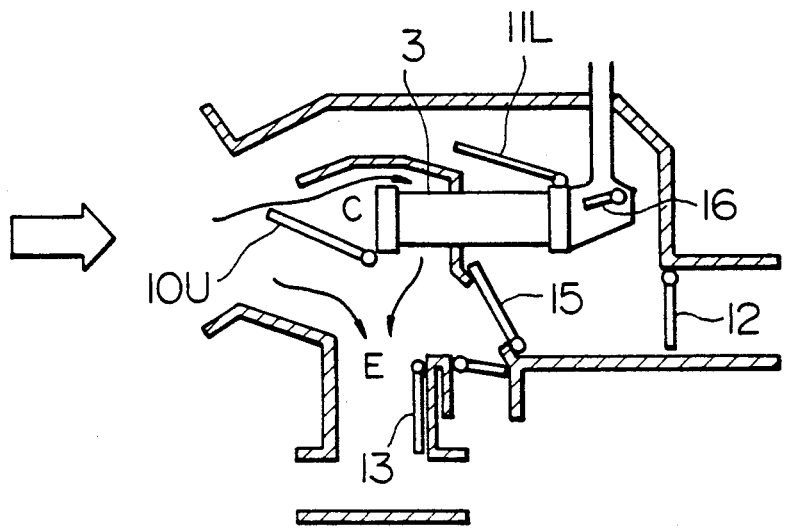
FIGS. 5 and 6 are similar diagrams to FIGS. 3 and 4 but show the heater unit operating in different blowout modes in accordance with teachings of the present invention.
Figure 6:
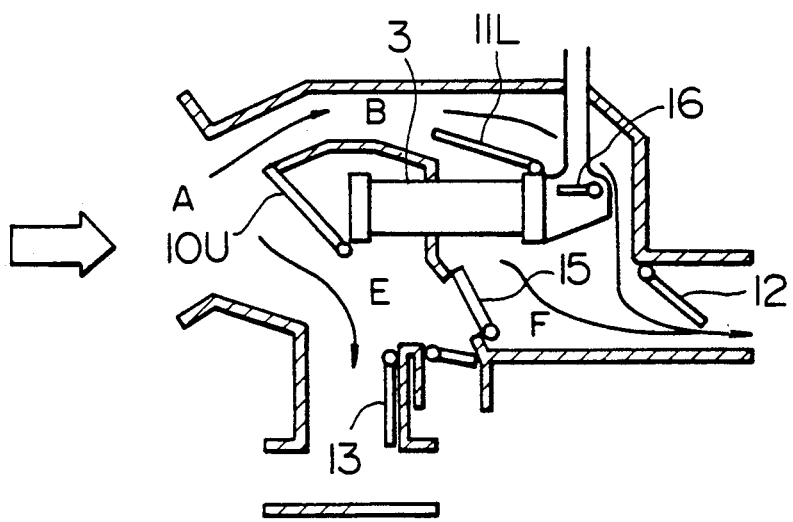
Figure 7:
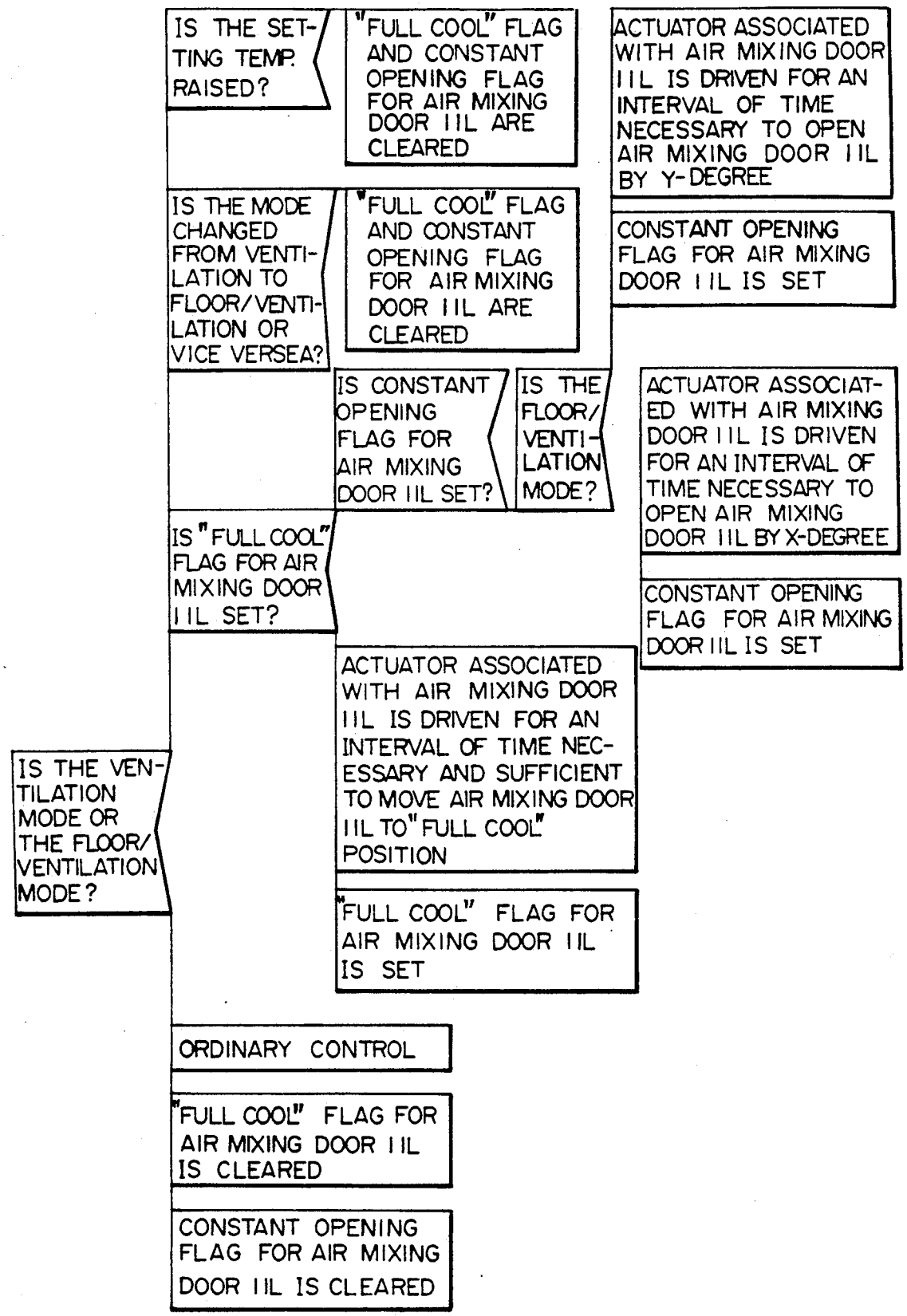
FIG. 7 is a PAD chart of control operation shown in FIGS. 5 and 6.

In accordance with an embodiment of the invention, the above problem can be solved as will be described with reference to FIGS. 5 to 7.

The controller 24 shown in FIG. 1 responds to values of the sensors 25 to 30 and the temperature setter 31 to calculate a blowout mode and a blowout temperature which are the most suitable at present and transmits control signals for driving the electric actuators 17 to 23. To this end, the control processing procedure is executed by the controller 24 as will be described below with reference to a PAD of FIG. 7. The controller 24 first decides whether the blowout mode is the ventilation mode or the floor/ventilation mode. If neither of them is selected, the ordinary control (upper and lower independent air conditioning) is carried out and a "Full Cool" flag indicating that the air mixing door 11L has been moved to "Full Cool" and a constant opening flag for the air mixing door 11L indicating that the air mixing door 11L is opened by a constant opening are cleared. But if any one of the ventilation mode and the floor/ventilation mode is selected, the following control is effected to prevent the passengers from temporarily suffering from uncomfortableness. Firstly, the controller 24 responds to a signal from the temperature setter 31 to decide whether the temperature setter 31 is manipulated to raise the setting temperature to thereby switch over the blowout mode. If the raising manipulation is determined, the "Full Cool" flag and constant opening flag for the air mixing door 11L are cleared. Thereafter, as shown in FIG. 7, it is decided, as in the case where the raising manipulation is not determined, whether a mode change from the ventilation mode to the floor/ventilation mode or vice versa takes place owing to changes in outside air temperature Ta and insolation amount Zm. If the blowout mode change is determined, the procedure proceeds, after completion of clearing of the "Full Cool" flag and constant opening flag for the air mixing door 11L, to a step where it is decided, as in the case where the blowout mode change is not determined, whether the succeeding setting of the "Full Cool" flag for the air mixing door L11 is effected, that is, the succeeding movement to "Full Cool" has been completed. If this step determines that the "Full Cool" flag for the air mixing door 11L is set, the air mixing door 11L is considered such that it has already been moved to "Full Cool" position. The "Full Cool" position is not affected by the previous air mixing door opening control and is an end point of the angular range over which the air mixing door is mechanically movable. Once the opening of the air mixing door 11L is shifted to the "Full Cool" position to fully close the water cock 16 interlocked with the air mixing door 11L, the air mixing door 11L is considered to be moved to a reference position which is used for the subsequently executable control of movement of the air mixing door 11L to the constant opening.

Then, it is decided whether the constant opening flag for the air mixing door 11L is set. If the flag is set indicating that the air mixing door 11L is opened to the constant opening position together with the water cock 16 interlocked with it, the actuator 19 is not operated. On the contrary, if the flag is not set, it is further decided whether the blowout mode is the floor/ventilation mode. Upon change of the blowout mode, a blowout temperature due to abrupt opening of the water cock 16 temporarily gives an uncomfortable feeling to the passengers. To eliminate this disadvantage, if the floor/ventilation mode is determined, the electric actuator 19 associated with the air mixing door 11L is operated for a constant interval of time necessary for the water cock 16 to open by Y degree, thereby permitting the water cock 16 to open to a position as shown in FIG. 6 at which loss of cooling capability can be suppressed even under the condition of the flow of hot water. Since the operation time of the air mixing door driving electric actuator is related substantially proportionally to the real opening of the air mixing door 11L and that of the water cock 16, the apparatus in accordance with the present embodiment can control the opening of the air mixing door to the constant opening without using any position detection signal produced from, for example, a potentiometer. Once the opening of the air mixing door 11L, consequently, the opening of the water cock 16 is set to the constant opening, the subsequent operation of the air mixing door 11L is not needed and therefore the constant opening flag for the air mixing door 11L is set.

If the floor/ventilation mode is not determined, the blowout mode is the ventilation mode. In the ventilation mode, upon change of the blowout mode, a blowout temperature due to abrupt opening of the water cock 16 also gives temporarily an uncomfortable feeling to the passengers. To eliminate this disadvantage, the water cock 16 is opened to a position as shown in FIG. 5 at which loss of cooling capability can be suppressed even under the condition of the flow of hot water. Accordingly, the electric actuator 19 associated with the air maxing door 11L is operated for a constant interval of time necessary for the water cock 16 to open by X degree (where $X > Y$ is held because cooling capability required for the ventilation mode is less than that required for the floor/ventilation mode) and thereafter the constant opening flag for the air mixing door 11L is set.

On the other hand, if the "Full Cool" flag for the air mixing door 11L is not set indicating that the positions of the air mixing door 11L and water cock 16 are uncertain, the air mixing door 11L is forced to move to the "Full Cool" position which is the previously-described reference position. Practically, the electric actuator 19 associated with the air mixing door 11L is operated for an interval of time which is sufficient to move the air mixing door 11L to the "Full Cool" position. This ensures that the air mixing door 11L can be moved exactly to the "Full Cool" position standing for the reference position, regardless of opening positions taken till then by the air mixing door 11L and water cock 16.

In this manner, when the air mixing door 11L is moved to the "Full Cool" position, the "Full Cool" flag to this effect is set and subsequently in order to operate the electric actuator 19 associated with the air mixing door 11L until the opening of the air mixing door 11L or of the water cock 16 takes a value complying with the ventilation mode or the floor/ventilation mode, the constant opening flag for the air mixing door 11L is cleared.

Since in accordance with the present embodiment the opening of the water cock 16 can be maintained at the position at which the minimum requisite cooling capability can be obtained when the blowout mode remains to be selectively set to the ventilation mode or the floor/ventilation mode, any blowout temperature prone to uncomfortableness to the passengers which is due to the abrupt flow of hot water into the heater core 3 upon opening of the water cock 16 can be prevented to advantage when the blowout mode changes to other modes than the above.

Figure 8:
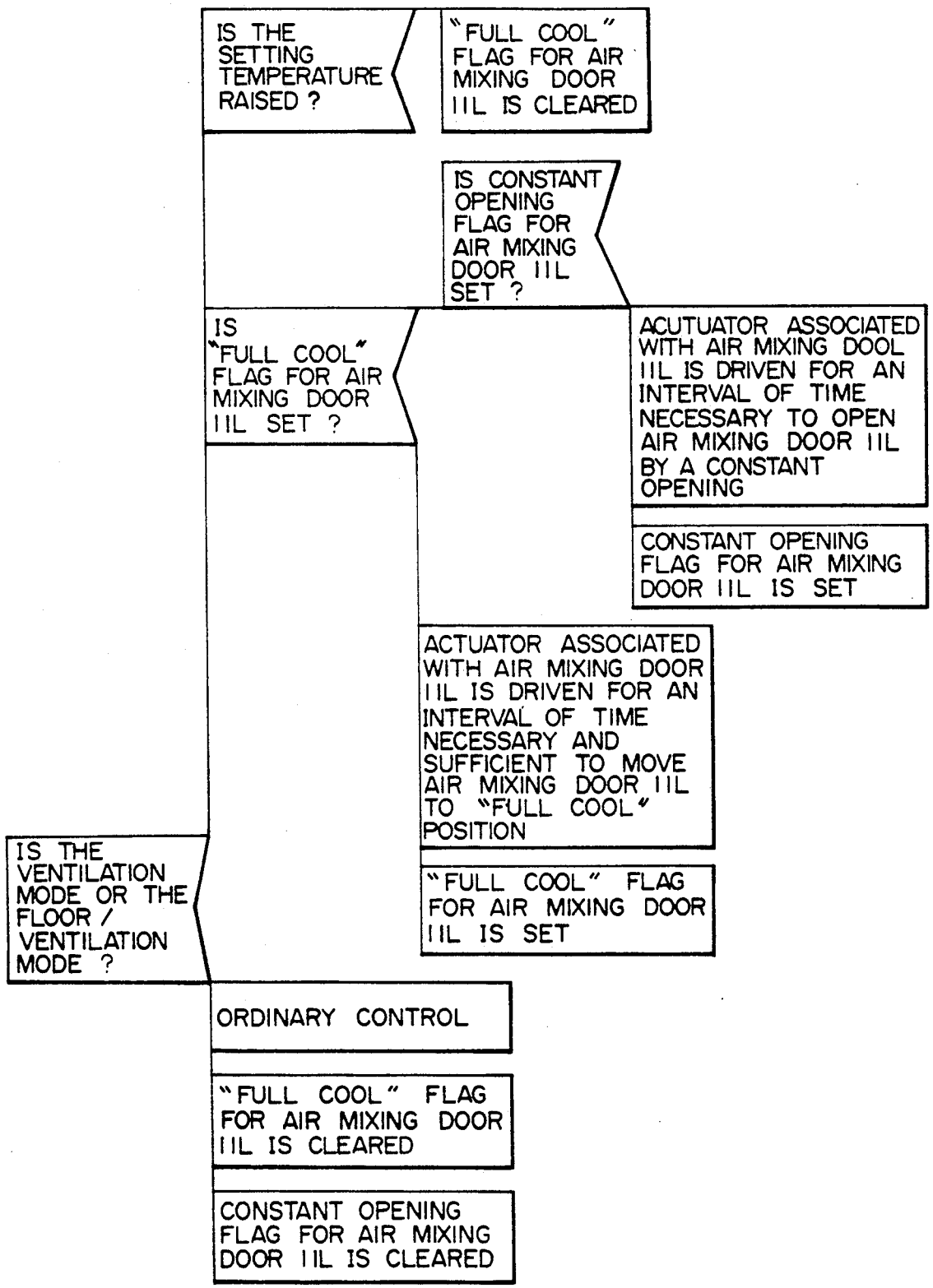
FIG. 8 is a PAD chart of control operation according to another embodiment of the invention.

Referring to FIG. 8, a second embodiment of the invention will now be described. The second embodiment is different from the previous embodiment in that the water cock is omitted but the fundamental construction is the same for the two embodiments.

The control processing procedure executed by the controller of FIG. 1 will be described with reference to a PAD of FIG. 8. It is decided whether the blowout mode is the ventilation mode or the floor/ventilation mode. If neither of them is selected, the ordinary control (upper and lower independent air conditioning) is carried out and it is indicated that the air mixing door 11L has been moved to "Full Cool". Then, the "Full Cool" flag is cleared and the air mixing door 11L is opened by a constant opening.

But if any one of the ventilation mode and the floor/ventilation mode is selected, the following control is effected to prevent the passengers from temporarily suffering from uncomfortableness. Firstly, the controller 24 responds to a signal from the temperature setter 31 to decide whether the temperature setter 31 is manipulated to raise the setting temperature to thereby switch over the blowout mode. If the raising manipulation is determined, the "Full Cool" flag is cleared. Thereafter, as shown in FIG. 8, the procedure proceeds to a step where it is decided, as in the case where the raising manipulation is not determined, whether the succeeding setting of the "Full Cool" flag for the air mixing door 11L is set, the air mixing door 11L is effected. If this step determines that the "Full Cool" flag for the air mixing door 11L is set, the air mixing door 11L is considered such that it has already been moved to the "Full Cool" position. The "Full Cool" position is not affected by the previous air mixing door opening control and is an end point of the angular range over which the air mixing door is mechanically movable. Once the degree of opening of the air mixing door 11L is shifted to the "Full Cool" position, the air mixing door 11L is considered to be moved to a reference position (reference opening) which is used for the subsequently executable control of movement of the air mixing door 11L to the constant opening.

Then, it is decided whether the constant opening flag for the air mixing door 11L is set. If the flag is set indicating that the air mixing door 11L is opened to the constant opening position, then nothing will be done.

On the contrary, if the flag is not set, the electric actuator 19 associated with the air mixing door 11L is operated for a predetermined constant interval of time in order to move the air mixing door 11L to a constant position at which its opening necessary for obtaining a comfortable blowout temperature for the floor can be obtained. Since the operation time of the air mixing door driving electric actuator 19 is related substantially proportionally to the real opening of the air mixing door, the apparatus in accordance with the present embodiment can control the opening of the air mixing door 11L to the constant opening without using any position detection signal produced from, for example, a potentiometer. Once the opening of the air mixing door 11L is set to the constant opening, the subsequent operation of the air mixing door 11L is not needed and therefore the constant opening flag for the air mixing door 11L is set.

On the other hand, if the "Full Cool" flag for the air mixing door 11L is not set indicating that the opening of the air mixing door subject to the previous air conditioning control is uncertain, the air mixing door is forced to move to the "Full Cool" position which is the previously-described reference position. Practically, in order to move the air mixing door 11L to the "Full Cool" position, the electric actuator 19 associated with the air mixing door 11L is operated. This ensures that the air mixing door 11L can be moved exactly to the "Full Cool" position standing for the reference position, regardless of opening positions taken till then by the air mixing door 11L.

In this manner, when the air mixing door 11L is moved to the "Full Cool" position, the "Full Cool" flag to this effect is set and subsequently to permit the operation for the constant opening of the air mixing door 11L, the constant opening flag for the air mixing door 11L is cleared.

Incidentally, in the event that abnormality such as defective contact of connectors and seizing of the air mixing door occurs in actual running of the vehicle, a failure to obtain the requisite constant opening through one cycle of operation of the air mixing door 11L takes place presumably.

To cope with this problem, in accordance with the present embodiment, even when the manipulation for raising the setting temperature is effected, the "Full Cool" flag is also cleared and the operation to open the air mixing door 11L to the constant opening is restarted.

In accordance with the present embodiment, when the ventilation mode or the floor/ventilation mode is selected as the blowout mode, the opening position of the air mixing door 11L can be controlled so as to be constant without using a signal representative of the position of the air mixing door and advantageously, the generation of blowout temperatures giving an uncomfortable feeling to the passengers can be prevented.

According to the present invention, an air conditioner for automobiles can be provided wherein the opening position of the air mixing door can be controlled exactly to a constant value without resort to any potentiometer for detection of the opening of the air mixing door when the ventilation mode or the floor/ventilation mode is selected as the blowout mode and therefore upon change to modes other than the above, the generation of uncomfortable blowout temperatures due to uncertain opening positions of the air mixing door can be prevented to insure comfortable air conditioning.

We claim:

1. A blowout temperature control apparatus of an air conditioner for automobiles said air conditioner having a plurality of air outlets inside a passenger compartment of an automobile comprising:

target blowout temperature determining means for determining a target blowout temperature on the basis of a signal representative of at least a setting temperature and a signal representative of an outside air temperature;

blowout air temperature detecting means for detecting blowout air temperature at said outlets of said air conditioner; and blowout temperature control means for controlling the amount of heat exchange of a heat exchanger such that a blowout air temperature detected by said blowout air temperature detecting means approaches said target blowout temperature, said blowout temperature control means including:

means for selecting one of a plurality of individual blowout modes in which certain of said air outlets are open to allow airflow therethrough and certain of said air outlets are closed to stop delivery of air;

blowout mode detecting means for detecting air flow from one of said air outlets associated with said blowout air temperature detecting means through which delivery of air is being stopped and generating a blowout stop signal; and blowout stop timed control means, responsive to the generation of said blowout stop signal, for controlling an air mixing door associated with said air outlet so as to temporarily change the amount of heat exchange of said heat exchanger to a reference level and again change the amount of heat exchange to a predetermined constant level complying with individual blowout modes and for maintaining the heat exchange amount at the constant level while said blowout stop signal is valid.

2. The blowout temperature control apparatus according to claim 1, wherein said blowout stop timed control means is also operable to temporarily change the amount of heat exchange of said heat exchanger to said reference level when manipulation to raise the setting temperature is effected and again change the heat exchange amount to a constant level.

3. The blowout temperature control apparatus according to claim 1, wherein said blowout temperature control means is interlocked with hot water flow rate regulating means for regulating the flow rate of hot water flowing through said heat exchanger.

4. A blowout temperature control apparatus of an air conditioner for automobiles, said air conditioner having a plurality of air outlets inside a passenger compartment of an automobile comprising:

target blowout temperature determining means for determining a target blowout temperature on the basis of a signal representative of at least a setting temperature and a signal representative of an outside air temperature;

blowout air temperature detecting means for detecting blowout air temperatures at air outlets of said air conditioner;

blowout temperature control means for controlling the amount of heat exchange of a heat exchanger such that a blowout air temperature detected by said blowout air temperature detecting means approaches said target blowout temperature;

hot water flow rate regulating means, interlocked with the operation of said blowout temperature control means, for regulating the flow rate of hot water flowing through said heat exchanger; and actuator drive means for driving said hot water flow rate regulating means and said blowout temperature control means in interlocked fashion;

wherein said hot water flow rate regulating means is controlled such that its opening takes the full open, the full close or a desirable predetermined intermediate open; and wherein the opening of said hot water flow rate regulating means is controlled to the intermediate open by forcibly changing the opening of said hot water regulating means temporarily to a reference opening and thereafter opening said water regulating means to a predetermined constant opening.

5. The blowout temperature control apparatus according to claim 4, wherein said reference opening is either the full open or the full close of said hot water flow rate regulating means.

6. The blowout temperature control apparatus according to claim 4, wherein the opening of said hot water flow rate regulating means is forcibly changed to said reference opening and said hot water flow rate regulating means is opened to said constant opening by operating said actuator drive means associated with said hot water flow rate regulating means for a predetermined constant interval of time.

7. A blowout temperature control apparatus according to claim 1, wherein said reference level corresponds to a position of said air mixing door in a fully closed position so as to reduce said amount of heat exchange to zero.

8. An outlet air temperature control apparatus of an air conditioner having a plurality of air outlets inside a passenger compartment of an automobile, comprising:

means for detecting temperature outside said passenger compartment of said automobile and amount of insolation onto said automobile;

means for determining target temperature values of said outlets discharging air-conditioned air on the basis of at least a signal representative of a setting temperature and a signal representative of an outside temperature;

means for detecting temperatures of air discharged from said outlets;

means for controlling outlet air temperatures detected by said temperature detecting remains such that the temperature of said outlet becomes close to said target temperature by controlling heat exchange amount in a heat exchanger of the air conditioner;

means for selecting an optimum combination of the outlets discharging an air-conditioned air among said plurality of outlets on the basis of said outside temperature, said setting temperature and the detected amount of insolation;

actuator means for controlling of opening said outlets of the optimum combination;

means for generating a stop signal to said actuator means to close a certain outlet when said selecting means selects a certain combination of the outlets including said certain outlet to be closed; and means for temporarily changing the heat exchange amount in the heat exchanger by a predetermined level upon receiving of said stop signal and then maintaining said changed heat exchange amount constant in existing of said stop signal.

9. A blowout temperature control apparatus of an air conditioner for automobiles, said air conditioner having a plurality of air outlets inside a passenger compartment of an automobile including a floor outlet, a ventilation outlet and a defroster outlet, comprising:

target blowout temperature determining means for determining a target blowout temperature on the basis of a signal representative of at least a setting temperature and a signal representative of an outside air temperature;

blowout air temperature detecting means for detecting blowout air temperature at said air outlets of aid air conditioner; and blowout temperature control means for controlling the amount of heat exchange of a heat exchanger such that a blowout air temperature detected by said blowout air temperature detecting means approaches said target blowout temperature, said blowout temperature control means including:

means for selecting one of a plurality of individual blowout modes including at least a floor mode in which said flow outlet is open and said ventilation and defroster outlets are closed, a ventilation mode in which said ventilation outlet is open and said floor and defroster outlets are closed, a defroster mode in which said defroster outlet is open, and a floor/ventilation mode in which said defroster outlet is closed, said ventilation outlet is open and said floor outlet is at least partially open;

blowout mode detecting means for detecting said individual blowout modes; and means for controlling an air mixing door associated with said floor outlet so as to temporarily change the amount of heat exchange of said heat exchanger to a reference level and again change the amount of heat exchange from said reference level to a predetermined constant level when said blowout mode detecting means detects said ventilation mode or said floor/ventilation mode.

* * * * *